United States Patent [19]

Hirano et al.

[11] Patent Number: 5,069,083
[45] Date of Patent: Dec. 3, 1991

[54] CONTINUOUS SPEED VARIABLE TRANSMISSION CONTROL APPARATUS

[75] Inventors: Sadayuki Hirano; Yoshinori Yamashita, both of Shizuoka; Takumi Tatsumi; Hiroaki Yamamoto, both of Hyogo, all of Japan

[73] Assignee: Suzuki Jidosha Kogyo Kabushiki Kaisha, Shizuoka, Japan

[21] Appl. No.: 588,762

[22] Filed: Sep. 26, 1990

[30] Foreign Application Priority Data

Sep. 30, 1989 [JP] Japan .................. 1-256340

[51] Int. Cl.$^5$ .............................................. B60K 41/16
[52] U.S. Cl. .......................................... 74/844; 74/856
[58] Field of Search .......................... 74/844, 856, 866

[56] References Cited

U.S. PATENT DOCUMENTS

| | | | |
|---|---|---|---|
| 3,020,776 | 2/1962 | May et al. | 74/844 |
| 3,106,104 | 10/1963 | Harry | 74/844 |
| 3,295,388 | 1/1967 | Groves | 74/844 |
| 3,377,922 | 4/1968 | Spender et al. | 74/844 X |
| 3,999,449 | 12/1976 | Chana et al. | 74/844 |
| 4,318,312 | 3/1982 | Morimoto et al. | 74/856 X |
| 4,474,081 | 10/1984 | Kinugasa et al. | 74/844 |
| 4,893,526 | 1/1990 | Tokoro | 74/856 X |
| 4,943,921 | 7/1990 | Baltusis et al. | 74/866 X |
| 4,961,315 | 10/1990 | Ishikawa et al. | 74/844 X |

FOREIGN PATENT DOCUMENTS

| | | |
|---|---|---|
| 57-186656 | 11/1982 | Japan . |
| 59-43249 | 3/1984 | Japan . |
| 59-77159 | 5/1984 | Japan . |
| 60-146949 | 8/1985 | Japan .................. 74/844 |
| 61-233256 | 10/1986 | Japan . |
| 62-37228 | 2/1987 | Japan .................. 74/844 |
| 64-44346 | 2/1989 | Japan . |

Primary Examiner—Leslie A. Braun
Assistant Examiner—Ryan Massey
Attorney, Agent, or Firm—Flynn, Thiel, Boutell & Tanis

[57] ABSTRACT

A method and apparatus for controlling a continuous speed variable transmission includes a pressure sensor for detecting atmospheric pressure, and a control unit which receives a detection signal from the pressure sensor. The control unit responds to the detected atmospheric pressure, the shift position of the transmission, and other predetermined conditions to correct clutch pressure and line pressure.

3 Claims, 4 Drawing Sheets

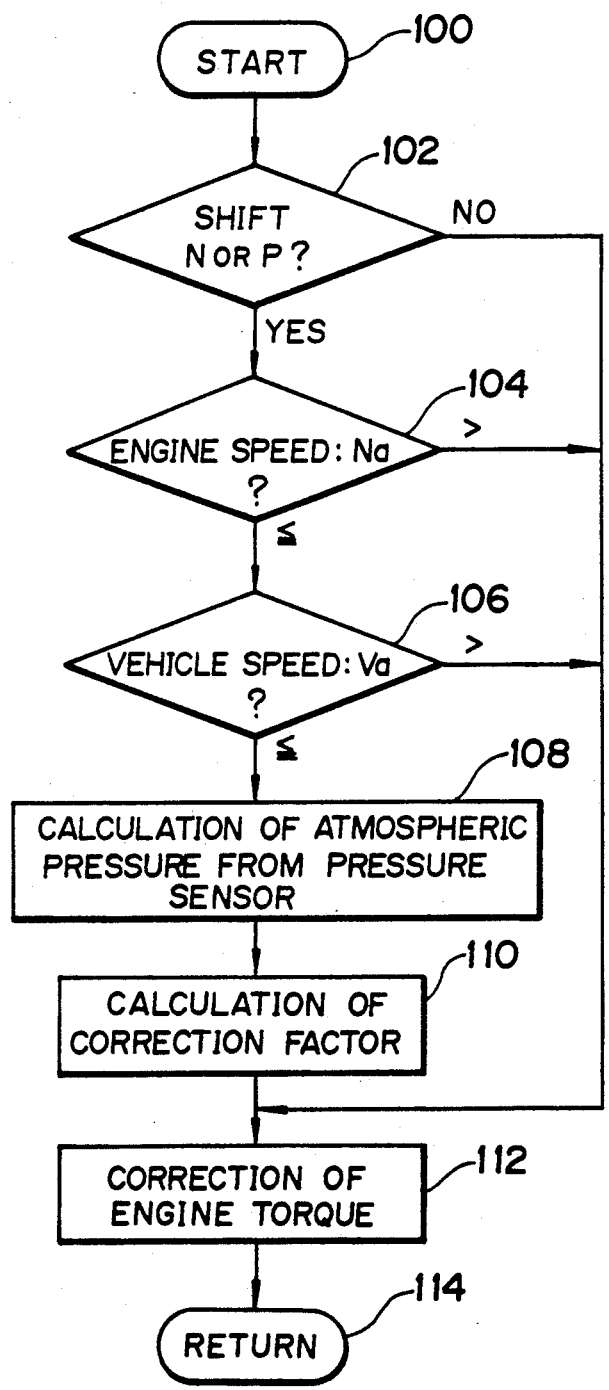

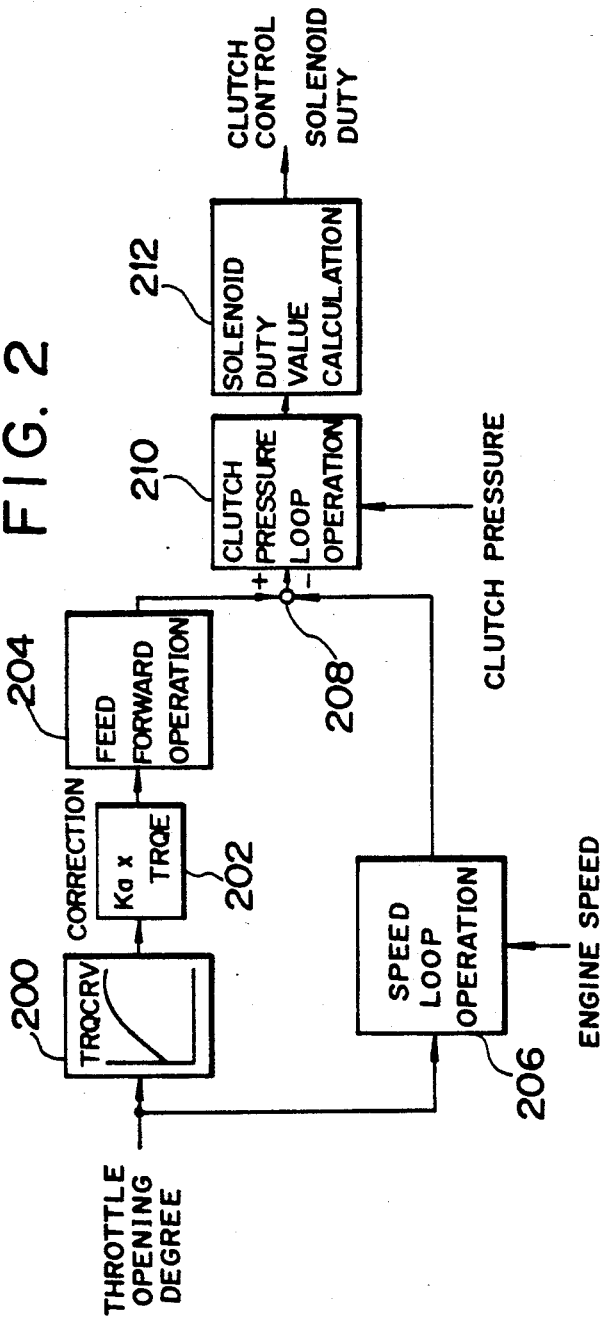
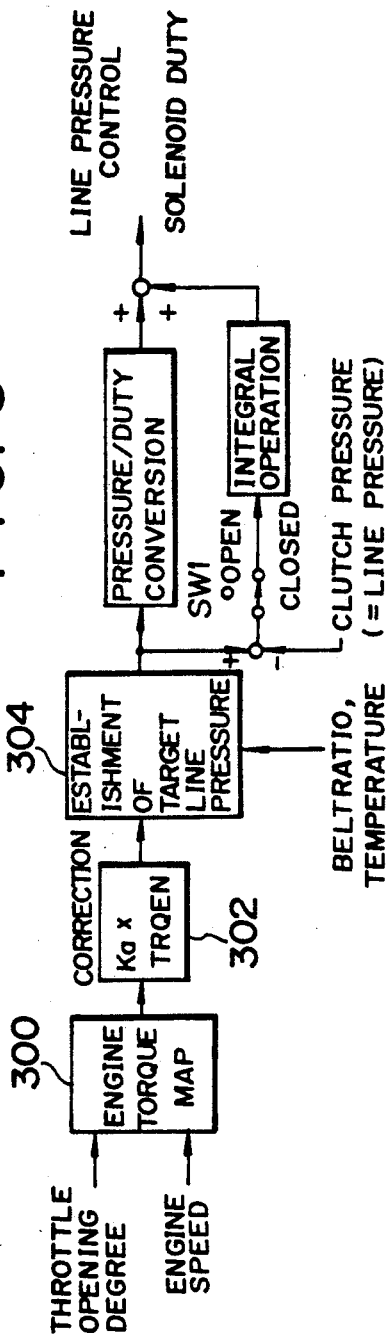

CONTINUOUS SPEED VARIABLE TRANSMISSION CONTROL APPARATUS

FIELD OF THE INVENTION

This invention relates to a continuous speed variable transmission control apparatus and method and particularly to a continuous speed variable transmission control apparatus and method for detecting atmospheric pressure by an absolute pressure detection type pressure sensor in accordance with the transmission shift position and other predetermined conditions and for correcting operating conditions such as clutch pressure and line pressure to proper levels by such detected atmospheric pressure.

BACKGROUND OF THE INVENTION

In a vehicle, a transmission system is disposed between the internal combustion engine and driving wheels. This transmission system changes the driving force of the driving wheels and traveling speed in accordance with traveling conditions of the vehicle which change in a wide range, thereby to derive the full performance of the internal combustion engine. In one example of a known transmission system, there is provided a continuous speed variable transmission control apparatus for transmitting power by increasing or decreasing the turning radius of a belt looped around pulleys, which pulleys each include a pulley element fixed to a rotational shaft and a movable pulley element which is separably supported relative to the stationary pulley element. By increasing and decreasing the width of a groove formed between the pulley elements, the turning radius of the belt (disposed in the groove) is changed thereby to change the belt ratio. Examples of this continuous speed variable transmission control apparatus are disclosed in Japanese Patent Early Laid-open Publication No. Sho 57-186656, Japanese Patent Early Laid-open Publication No. Sho 59-43249, Japanese Patent Early Laid-open Publication No. Sho 59-77159, and Japanese Patent Early Laid-open Publication No. Sho 61-233256.

Also, the present applicant has already developed the subject matter of Japanese Patent Early Laid-open Publication No. Sho 64-44346, namely a method for controlling a continuous speed variable transmission. This method controls speed change by providing a control unit for receiving a detection signal representing throttle opening degree, a signal representing vehicle speed, and a command for restricting the engine speed in a shift position, and for deciding a final target engine speed.

In the conventional continuous speed variable transmission control apparatus, when the line pressure is controlled, in other words, when closed loop control is performed, an engine torque value is calculated from a torque map based on the opening degree of the throttle and the engine speed. Such calculated engine torque value is initially memorized in a control unit, a target line pressure is calculated from the engine torque value, and then the actual hydraulic line pressure is fed back.

Also, when clutch pressure is controlled, the engine torque is calculated from the opening degree of the throttle when the vehicle is started, and a clutch target pressure is obtained as a feed forward quantity.

In general, the engine torque at high elevations (i.e., in low pressure area) is further lowered as the low pressure state progresses, and is apparent from the following equation:

$Te_1 = Te_0 \times K \times atm/760$, where
$Te_1$ = engine torque at a high elevation,
$Te_0$ = engine torque at sea level, and
$K$ = correction factor.

However, in the conventional device, because the initially memorized engine torque value is used to calculate clutch pressure, there is an inconvenience in that no correction is made for the aforementioned effect at high elevations, and the clutch pressure becomes high at vehicle starting time and engine speed is not increased. This eventually causes the driver to think that the vehicle is lacking power.

The same is true of the line pressure. As the line pressure target value becomes higher than necessary, the output load on the engine is increased with respect to the line pressure control during traveling of the vehicle, resulting in deterioration of acceleration, ascending ability on uphill roads, and traveling ability. This again causes the driver to think that the vehicle lacks power.

It is therefore an object of the present invention to provide a continuous speed variable transmission control method and apparatus which includes an absolute pressure detection type pressure sensor for detecting atmospheric pressure, and a control unit for responding to atmospheric pressure detected through said pressure sensor in accordance with the transmission shift position and other predetermined conditions and correcting operational conditions such as clutch and line pressures to proper levels based on such detected atmospheric pressure, thus permitting satisfactory acceleration, ascending ability and traveling ability to be maintained in accordance with the atmospheric pressure.

The transmission control method and apparatus of the present invention changes the belt ratio by increasing and decreasing the turning radius of the belt by respectively decreasing and increasing the width of the groove between the stationary and movable pulley elements. The method and apparatus further includes an absolute pressure detection type pressure sensor for detecting atmospheric pressure, and a control unit for responding to atmospheric pressure detected through said pressure sensor in accordance with the transmission shift position and other predetermined conditions and correcting the clutch and line pressures to proper levels based on such detected atmospheric pressure.

BRIEF DESCRIPTION OF THE DRAWINGS

An embodiment of the present invention will be described in detail with reference to the drawings, in which:

FIG. 1 is a flowchart which explains how the present invention controls a belt drive type continuous speed variable transmission;

FIG. 2 is a block diagram for explaining how the present invention controls the clutch pressure of the transmission;

FIG. 3 is a block diagram for explaining how the present invention controls the line pressure of the transmission;

DETAILED DESCRIPTION

Figure 4:
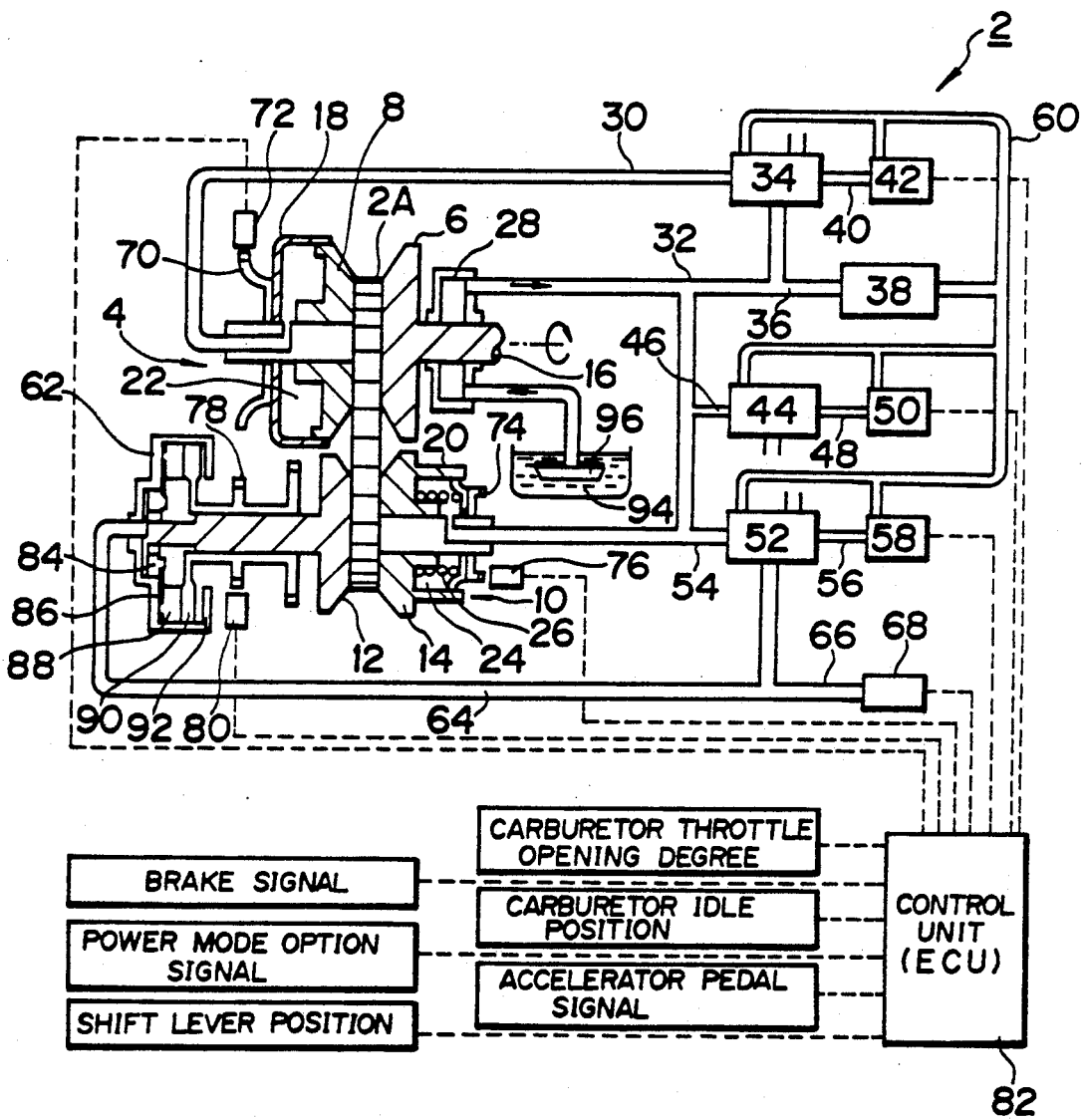
FIG. 4 is a block diagram of the belt drive type continuous speed variable transmission according to the invention.

FIGS. 1 through 6 show an embodiment of the present invention. In FIG. 4, the numeral 2 denotes a belt drive type continuous speed variable transmission, 2A a belt, 4 a drive side pulley having an axially stationary drive side pulley element 6 and an axially movable drive side pulley element 8, 10 a driven side pulley having an axially stationary driven side pulley element 12 and an axially movable driven side pulley element 14. The pulley element 6 is fixed to a rotational shaft 16, and the movable pulley element 8 is supported relative to the rotational shaft 16 such that the pulley element 8 can move in the axial direction of the rotational shaft 16 but cannot rotate therewith. The driven side pulley 10, including stationary pulley element 12 and movable pulley element 14, has a similar construction.

The drive side movable pulley element 8 and the driven side movable pulley element 14 are provided with first and second housings 18 and 20, respectively, and first and second hydraulic oil chambers 22 and 24 are defined by the first and second housings 18 and 20, respectively. Biasing means 26 such as a spring is disposed within the second hydraulic oil chamber 24 for urging movable pulley element 14 so as to expand the second hydraulic oil chamber 24.

The rotational shaft 16 is provided with an oil pump 28, which communicates with the first and second hydraulic oil chambers 22 and 24 through first and second oil passages 30 and 32, respectively. The first oil passage 30 is provided at its intermediate part with a primary pressure control valve 34 acting as a change speed control valve for controlling primary pressure as input shaft sheave pressure. Also, a constant pressure control valve 38 is provided between the oil pump 28 and the primary pressure control valve 34, and communicates with the first oil passage 30 through a third oil passage 36. The valve 38 is adapted to control line pressure (generally 5 to 25 kg/cm$^2$) to a constant pressure (3 to 4 kg/cm$^2$). The primary pressure control valve 34 communicates with a primary pressure controlling first three-way electromagnetic valve 42 through a fourth oil passage 40.

Similarly, an intermediate part of the second oil passage 32 communicates through a fifth oil passage 46, with a line pressure control valve 44 having an escape valve function for controlling line pressure as pump pressure, and this line pressure control valve 44 communicates with a line pressure controlling second threeway electromagnetic valve 50 through a sixth oil passage 48.

Furthermore, an intermediate part of the second oil passage 32 between the second hydraulic oil chamber 24 and the line pressure control valve 44 communicates, through a seventh oil passage 54, with a clutch pressure control valve 52 for controlling clutch pressure This clutch pressure control valve 52 communicates with a clutch pressure controlling three-way electromagnetic valve 58 through an eighth oil passage 56.

The primary pressure control valve 34, the primary pressure controlling first electromagnetic valve 42, the constant pressure control valve 38, the line pressure control valve 44, the line pressure controlling second electromagnetic valve 50, the clutch pressure control valve 52, and the third electromagnetic valve 58 communicate with each other through a ninth oil passage 60.

The clutch pressure control valve 52 communicates, through a tenth oil passage 64, with a hydraulic start clutch 62. An intermediate part of this tenth oil passage 64 communicates with a pressure sensor 68 through an eleventh oil passage 66. This pressure sensor 68 is an absolute pressure detection type sensor and is adapted to detect atmospheric pressure and also can directly detect hydraulic oil pressure when clutch pressure is being controlled. Moreover, as the clutch pressure becomes equal to the line pressure when in a drive mode, this sensor 68 also contributes to line pressure control.

The first housing 18 is provided outside thereof with an input shaft rotation detecting gear 70, and an input shaft side first rotation detector 72 is disposed in the vicinity of the outer peripheral portion of this input shaft rotation detecting gear 70. Also, the second housing 20 is provided outside thereof with an output shaft rotation detecting gear 74, and an output shaft side second rotation detector 76 is disposed in the vicinity of an outer peripheral portion of this output shaft rotation detecting gear 74. Detection signals from the first and second rotation detectors 72 and 76 are output to a control unit 82, which will be described below, in order to obtain engine speed and belt ratio.

The hydraulic start clutch 62 is provided with an output transmitting gear 78, and a third rotation detector 80 adapted to detect rotation of a final output shaft is disposed in the vicinity of the outer peripheral portion of this gear 78. That is, this third rotation detector 80 is adapted to detect rotation of the final output shaft which is directly connected to a reduction gear and a differential gear, a drive shaft, and tires. The rotation detector 80 is therefore capable of detecting the speed of the vehicle. Also, input and output rotation of the hydraulic start clutch 62 can be detected by the second and third rotation detectors 76 and 80, respectively, and thus can contribute to the detection of clutch slip amount.

The control unit 82 is provided for controlling speed change by inputting various conditions such as opening degree of the throttle of a carburetor (not shown) of the vehicle, engine speed, vehicle speed, etc. from the first to third rotation detectors 72, 76 and 80 in order to change a duty rate and thereby control the opening and closing actions of the three-way electromagnetic valves 42, 50, and 58. This control unit 82 is also designed to control the pressure sensor 68.

As will be evident from the following discussion, the control unit 82 may be implemented by a conventional microprocessor circuit.

Functions of various signals to be input into the control unit 82 will now be described in detail.

(1) Detection Signal of Shift Lever Position

To control line pressure, belt ratio and clutch pressure for each range corresponding to a range signal such as P, R, N, D, L, etc.

(2) Detection Signal of Opening Degree of Carburetor Throttle

To establish a target belt ratio or a target engine speed by using this signal to detect engine torque from a memory initially input into a program.

(3) Detection Signal of Carburetor Idle Position

To correct the opening degree sensor of the carburetor throttle and to enhance accuracy in control (4) Accelerator Pedal Signal To determine a control direction during traveling or at vehicle starting time by detecting the will of the driver in accordance with the depression of the accelerator pedal.

(5) Brake Signal

To determine a control direction such as disengagement of clutch plates by detecting whether or not the brake pedal is being depressed.

(6) Power Mode Option Signal

To use as option in order to make the performance of the vehicle selectively more like a sports car or an economy car.

The control unit 82 has such construction as being able to detect atmospheric pressure by the pressure sensor 68 in accordance with a predetermined transmission shift position and other predetermined conditions so that clutch and line pressure can be corrected to proper states in accordance with such detected atmospheric pressure.

More specifically, after the engine is started when the shift position is N or P, atmospheric pressure is detected by the pressure sensor 68. Then atmospheric pressure is calculated by the control unit 82 from the output voltage of the pressure sensor 68, and a correction factor is calculated as the ratio of the detected atmospheric pressure to the pressure value at sea level. That is, a correction factor Ka is found from the following relation:

$Ka = Pa/760$, where $Pa$ = detected atmospheric pressure, and where 760 represents atmospheric pressure at sea level (expressed in millimeters of mercury).

Figure 5:
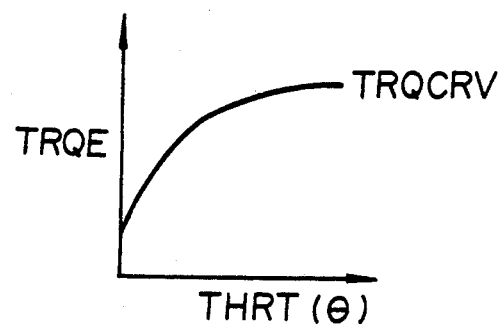
FIG. 5 is a diagram showing a torque curve of target engine torque as a function of throttle opening degree.

When clutch pressure is controlled, a target engine torque value TRQE is calculated, as shown in FIG. 5, from throttle opening degree THRT using a map of an engine torque curve TRQCRV which has been initially stored in control unit 82. This target engine torque TRQE is then multiplied by the correction factor Ka, yielding a final engine torque value $TRQEZ = Ka \times TRQE$, and then the final engine torque TRQEZ is utilized as a corrected engine torque value.

Figure 6:
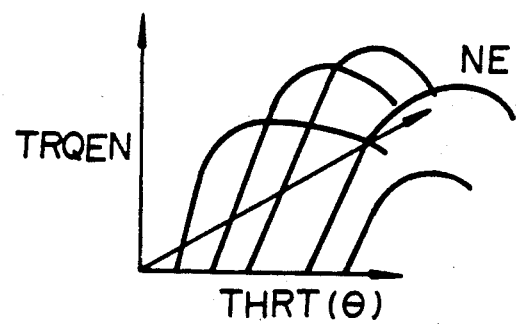
FIG. 6 is a diagram showing torque curves of target engine torque as a function of throttle opening degree and vehicle speed.

In line pressure controlling, a target engine torque value TRQEN is calculated, as shown in FIG. 6, from throttle opening degree THRT and engine speed NE using a map of an engine torque curve TRQCRV which has been initially stored in control unit 82. This target engine torque TRQEN is then multiplied by the correction factor Ka, yielding a final engine torque value $TRQENZ = Ka \times TRQEN$, and then this final engine torque TRQENZ is utilized as a corrected engine torque value.

Furthermore, the correction factor Ka is calculated only when other conditions such as engine speed NE and vehicle speed V being low, and a pressure value in the clutch being not raised by centrifugal force are met, in addition to the condition that the shift position is N or P, as disclosed in the FIG. 1 flowchart, which will be described afterwards. This increases the accuracy of atmospheric pressure detection.

In FIG. 4, the numeral 84 denotes a piston of the hydraulic start clutch 62, 86 an annular spring, 88 a first pressure plate, 90 a friction plate, 92 a second pressure plate, 94 an oil pan and 96 an oil filter.

Operation of the invention will now be described.

The belt drive type continuous speed variable transmission 2, as shown in FIG. 4, is designed such that the oil pump 28 located on the rotational shaft 16 is activated in accordance with the actuation of the rotational shaft 16 and the oil is taken in from the oil pan 94 at the bottom of the transmission through the oil filter 96. The pump pressure is controlled by the line pressure control valve 44 to produce the desired line pressure. If a large quantity of oil is permitted to escape through this line pressure control valve 44 into a reservoir, the line pressure becomes low. As the amount of escaping oil becomes smaller, the line pressure becomes higher.

Next, electronic control of the belt drive type continuous speed variable transmission 2 will be described.

The continuous speed variable transmission 2 is hydraulic controlled and at the same time, proper line pressure for holding the belt and transmitting torque, primary pressure for changing the gear ratio, and clutch pressure for reliably connecting the clutch plates are respectively secured in accordance with commands from the control unit 82 to the electromagnetic valves 50, 42 and 58.

This will be further described with reference to the FIG. 1 flowchart for controlling the belt drive type continuous speed variable transmission 2.

A program for controlling the engine revolution of the belt drive type continuous speed variable transmission 2 is started at 100 by actuation of the internal combustion engine (not shown), and it is judged (i.e. determined) at 102 whether the shift position is N or P.

If the judgement at 102 is YES, then the next step 104 compares the engine speed NE with an established engine speed Na which is trially established by the engine speed NE, and if the judgement at 102 is NO, then an engine torque correction step 112 (which will be described below) is executed.

If the actual engine speed NE is smaller than or equal to the established engine speed Na in the abovementioned comparison 104, then a comparison is performed at 106 between the vehicle speed V and an established vehicle speed Va. If the engine speed NE is larger than the established engine speed Na, then the engine torque correction step 112 is performed.

If the vehicle speed V is smaller than or equal to the established vehicle speed Va in the comparison 106, then atmospheric pressure is calculated at 108 from the pressure sensor 68. If the vehicle speed V is larger than the established vehicle speed Va, then the engine torque correction step 112 is performed.

The atmospheric pressure Pa is calculated at 108 from an output voltage from the pressure sensor 68. The correction factor Ka is found at 110 from the aforementioned equation, $Ka = Pa/760$.

The target engine torque value is then multiplied by this correction factor Ka at 112 to correct the engine torque.

After this engine torque correction step 112, the program ends at 114.

Note that whenever the shift position is not N or P, whenever $NE > Na$, or whenever $V > Va$, atmospheric pressure is not detected and no correction factor is calculated, so correction for low atmospheric pressure does not occur during torque correction step 112.

The clutch pressure control of the belt drive type continuous speed variable transmission 2 will be described with reference to FIG. 2.

First, the target engine torque TRQE is calculated at 200 using the map (see FIG. 5) of the torque curve TRQCRV in accordance with the detection signal of the throttle opening degree (Θ) of the carburetor. This target engine torque TRQE is multiplied by the correction factor Ka such that the final engine torque $TRQEZ = Ka \times TRQE$ is found at 202. This final engine torque TRQEZ is feed forward processed (204).

Also, a speed loop operation is performed at 206 with the throttle opening degree Θ of the carburetor and the engine speed. The result of the speed loop operation is applied to the final engine torque TRQEZ as shown at 208. A clutch pressure loop operation 210 is performed based on the clutch pressure. Using the result of the clutch pressure loop, a solenoid duty value is calculated at 212, and a clutch control solenoid duty (signal) is output to the clutch pressure control electromagnetic valve 58, which controls the clutch valve 52.

Also, the line pressure control of the belt drive type continuous speed variable transmission 2 will be described with reference to FIG. 3.

The target engine torque TRQEN is calculated at 300 using the map (see FIG. 6) of the torque curve TRQCRV which is a function of the throttle opening degree of the carburetor and the engine speed. This target engine torque TRQEN is then multiplied by the correction factor Ka, yielding the final engine torque TRQENZ=Ka×TRQEN at 302. The target line pressure is established at 304 based on this final engine torque TRQENZ, the belt ratio and, for example, oil temperature.

A line pressure control solenoid duty value is determined based on this target line pressure and is output to the line pressure control electromagnetic valve 50, which controls the line pressure valve 44. The difference between the target line pressure and the clutch pressure is fed back.

The time for effecting feed-back control in the line pressure control is when the relation "clutch pressure=line pressure" is established, and the clutch solenoid duty becomes 0% to disengage the clutch plates. In that state, the switch SW1 of FIG. 3 is in the "closed" position.

Where the switch SW1 is open loop controlled, the solenoid is controlled by computing the duty rate with reference to the target line pressure value and the pressure—solenoid duty map which have been decided up to "304" and thus, the switch SW1 is in the "open" position.

And when the switch SW1 is in the "closed" position, a pressure value is input into the integrator only by a different portion of the current line pressure from the target line pressure value. Such procedure is kept going on as long as the current line pressure is not coincident with the target line pressure value. That is, when the switch SW1 is in the "closed" position, an additional function for correcting the displacement of the pressure—solenoid duty map when the switch SW1 is in the "open" position is applied and as a result, there can be obtained a line pressure equal to the target value.

Atmospheric pressure is detected by the absolute pressure detection type pressure sensor 68, and the clutch pressure and line pressure can be corrected to proper levels using such detected atmospheric pressure. Thus, acceleration, ascending ability on an uphill road and traveling ability can be maintained in good condition in accordance with the atmospheric pressure. As a result, the vehicle driver will not think that the vehicle lacks in power, which is advantageous in actual practice.

Also, the above-described system using the absolute pressure detection type pressure sensor can be easily implemented by adding two additional programs for controlling detection of atmospheric pressure and for torque correction calculation. Thus, the construction does not become complicated, and manufacturing cost can be maintained low and thus economically advantageous.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined a follows:

1. In a continuous speed variable transmission control apparatus for controlling a continuous variable speed transmission having a belt looped around adjustable pulleys and received in respective grooves of said pulleys defined between relatively movable pulley elements, and means for changing the belt ratio including means for increasing and decreasing the belt turning radius by respectively decreasing and increasing the width of said grooves, the improvement comprising an absolute pressure detection type pressure sensor for detecting atmospheric pressure, and a control means for detecting atmospheric pressure through said pressure sensor in accordance with the shift position of the transmission and other predetermined conditions and for correcting clutch pressure and line pressure to proper levels based on said detected atmospheric pressure.

2. A method for controlling a transmission of an engine driven vehicle immediately prior to and during the start of vehicle motion, comprising the steps of:
   determining the position of the vehicle throttle;
   determining a target engine torque value based on the throttle position;
   detecting an ambient atmospheric pressure value which represents the atmospheric pressure around the vehicle;
   comparing said detected ambient atmospheric pressure value with a predetermined atmospheric pressure value and calculating a correction factor based on said comparison;
   using said correction factor to adjust said target engine torque value to a corrected engine torque value;
   determining a target clutch pressure value based on said corrected engine torque value; and
   controlling clutch pressure in said transmission based on said corrected engine torque value.

3. The method according to claim 2, including the step of controlling line pressure in said transmission based on said corrected engine torque value.

* * * * *